March 4, 1969

J. P. BILLINGS 3,431,422

WEIGHING SYSTEM INCLUDING OPTICALLY ACTUATED ADJUSTABLE
SET POINT CONTROL CIRCUIT HAVING SWITCH
FOR SELECTING RESET MODE

Filed March 15, 1965

INVENTOR
James P. Billings
BY
Blair and Buckles
ATTORNEY

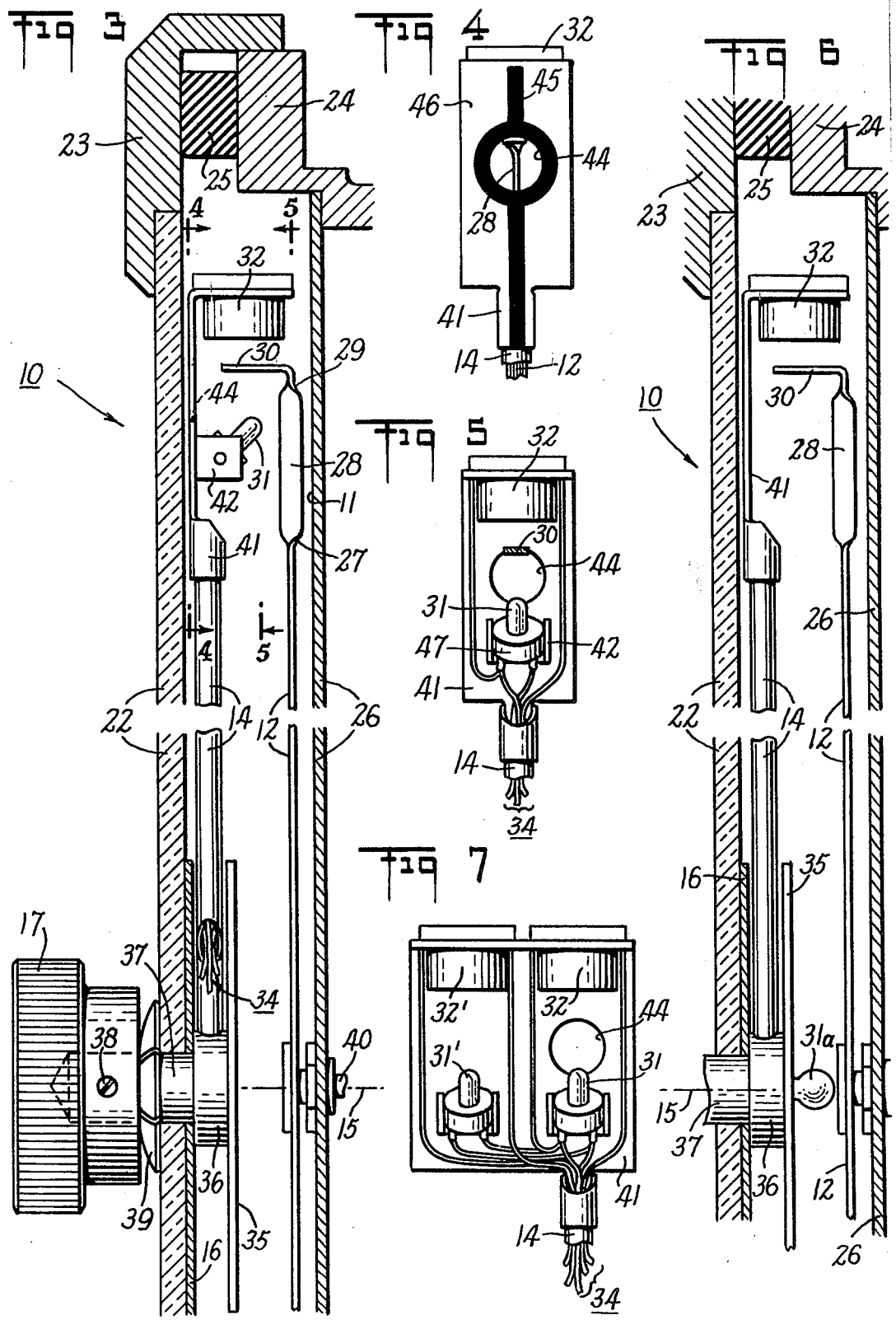

United States Patent Office 3,431,422
Patented Mar. 4, 1969

3,431,422
WEIGHING SYSTEM INCLUDING OPTICALLY ACTUATED ADJUSTABLE SET POINT CONTROL CIRCUIT HAVING SWITCH FOR SELECTING RESET MODE
James P. Billings, Stamford, Conn., assignor to The A. H. Emery Company, New Canaan, Conn.
Filed Mar. 15, 1965, Ser. No. 439,655
U.S. Cl. 250—214                    2 Claims
Int. Cl. H01j 39/12; G01d 5/34

ABSTRACT OF THE DISCLOSURE

The disclosed weighing system includes a graduated scale and a weight indicating scale pointer carrying a knife edge facilitating visual weight reading and a flag adapted to interrupt illumination of a photodetector when the pointer responds to a preselected weight. The detector and illumination source are energized from an A.C. source. A controlled rectifier is connected either directly to the A.C. source or to a full wave rectifier network by a mode switch and is rendered conductive to energize a relay for actuating an external controller when the photodetector is not illuminated. Plural photodetectors may be employed to effect progressive actuation of the external controller.

---

This invention relates to improvements in automatic control devices, and more particularly to a process weighing system for both indicating visually the weight of a load measuring device and for automatically activating a remote valve, gate, or other control when a preset weight is reached.

One of the problems in process weighing operations heretofore has been the possibility of human error because an operator has had to watch a scale dial until a predetermined weight was indicated, in accordance with a batching formula, then when the desired weight has been obtained, the operator has had to close a valve or gate in order to prevent overfilling or overemptying of the bin or container being weighed. The present invention provides a simple, reliable and economical means for automatically controlling batching or process weighing operations, and at the same time provides a visual indication for a supervisor or inspector to observe the exact weights of materials in each measured batch.

Prior art efforts at fully automatic batching control have entailed the use of complicated and costly computers, in which errors might be introduced by the computer, or by dirty or sticking relay contacts, and such errors might go undetected for some time due to the lack of supervisory visual inspection means. Prior efforts at controlling such automatic operations through actuation of a precision gauge needle wiper contact have generally been unsatisfactory because the load imposed upon the indicator needle at the instant of contact caused inaccuracies in weighing and erratic operation of the needle pointer. The present invention overcomes these difficulties of the prior art by employing miniature light sources in combination with a solid state photocell circuit which responds instantaneously, within $\frac{1}{2000}$ of scale reading, without imposing any load or drag on the scale indicator.

The invention also includes means for anticipating the attainment of a preselected weight measurement, to effect a reduction in flow rate of material into or out of a bin or hopper at a predetermined measurement before final cutoff. Thus, by reducing the flow to a dribble shortly before the desired weight is indicated, greater accuracy in weighing is obtained and "overshooting" of the mark is prevented.

Accordingly it is an object of the invention to provide an improved automatic triggering device for actuation by a dial scale indicator upon the attainment of any preselected setting.

Another object of the invention is to provide such an automatic triggering device capable of operating remotely controlled electrical circuit devices.

A further object of the invention is to provide an adjustable set point control capable of being added to existing types of scale indicators.

Yet another object of the invention is to provide apparatus of the above character with flexibility to permit a choice of triggering and automatic reset, or holding a remote control in its triggered condition until a second preselected indication is attained on the scale dial.

Another object of the invention is to provide means in an automatic weighing control for anticipating the attainment of any preselected weight, and for actuating a remote control to reduce the rate of flow of material being weighed shortly before the desired weight is reached, and then accurately stopping the flow at the exact weight desired.

A still further object of the invention is to provide apparatus of the above character which is completely reliable under adverse conditions such as smoke, dust, or varying extraneous illumination, and which incorporates fail safe means to prevent errors in batch weighing due to power failures.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 3 is an enlarged cross-sectional view of a scale indicator incorporating the set point control apparatus of the invention;

FIGURE 4 is a front view of the set point indicator of the invention taken along the line 4—4 of FIGURE 3;

FIGURE 5 is a rear view of the set point indicator of FIGURE 4, taken along the line 5—5 of FIGURE 3, and showing the photoelectric cell and miniature light source mounted therein;

FIGURE 6 is a partial cross-sectional view of a scale indicator, similar to that of FIGURE 3, but illustrating an alternative embodiment of the invention; and FIGURE 7 is a rear view of a dual detector set point indicator similar to that of FIGURE 5 but having a second photocell and light source mounted adjacent to the primary set point detector, to control dribble feed before cutoff.

Similar reference numerals identify corresponding parts in the several views of the drawings.

Description of indicator and set points

Figure 1:
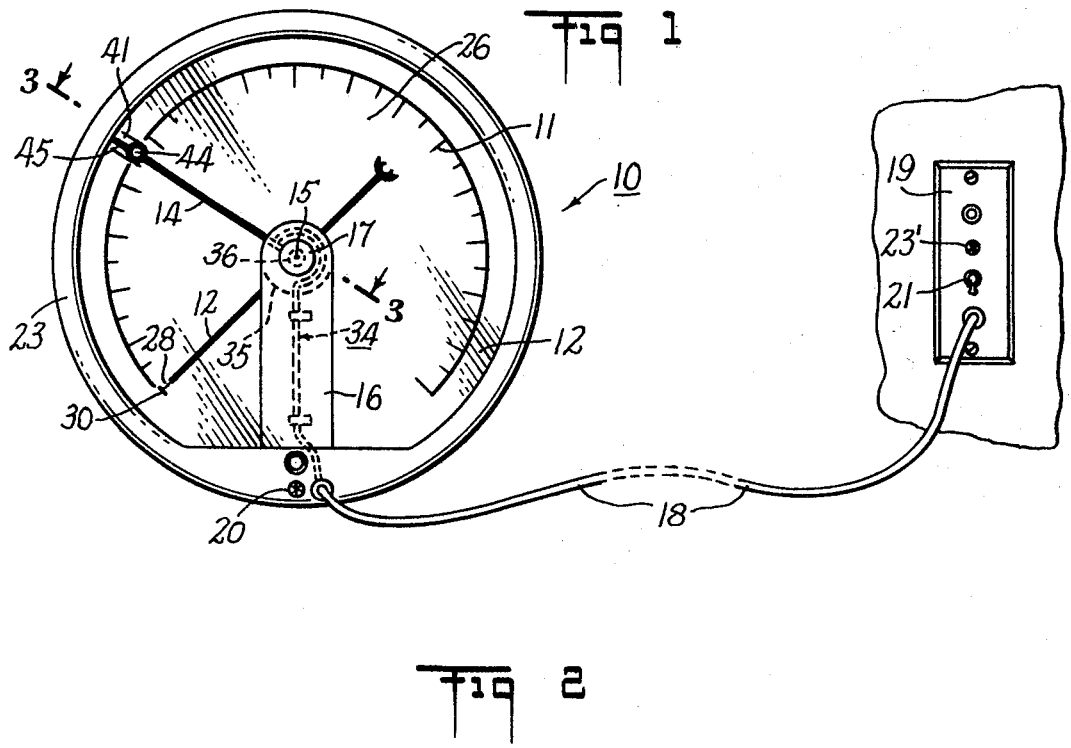
FIGURE 1 is a front view of a scale indicator incorporating the adjustable set point means of the invention and being connected by electrical cable to a remote control box.

Referring now in greater detail to the drawings, FIGURE 1 shows a weighing scale indicator 10 having a graduated weight scale 11 and a rotatable pointer 12 responsive to force measuring means (not shown) to rotate pointer 12 about the central axis 15 in a clockwise direction in accordance with the amount of force or weight applied to the force measuring apparatus. An adjustable set point indicator arm 14 is mounted on a centrally disposed support 16 for adjustable positioning about the axis 15 by means of an externally extending manually operable knob 17. The active electrical elements of the set point indicator 14 are connected by means of a cable 18 to a remote control box 19. A visual indicating lamp 20 may be mounted on the front of the indicator 10 and connected through the cable 18 to the electrical control box 19 to provide a flashing light indication when the scale pointer 12 intersects the radial position of the manually preset pointer 14. A two-position manually operable switch 21 on the control panel of the control box 19 provides a choice of maintained or reset operation, as will be hereinafter described in more detail. An indicator lamp 23' is provided on the control panel 19 to indicate when power is applied to the remote controller (not shown) which operates a valve or gate to control the flow of material to the weighing container.

Referring now to FIGURE 3 of the drawings, it will be seen that the indicator 10 includes a transparent glass cover 22 mounted in a circular bezel 23, which is secured in a suitable manner to the indicator casing 24. A spacing ring or gasket 25, seen in cross-section in FIGURE 3, maintains the desired spacing between the bezel 23 and the casing 24. The graduated scale face 11 of the indicator 10 is mounted, printed, or engraved upon the inner surface of a back plate 26 which is suitably mounted to and supported by a casing member 24. The scale pointer 12, which is rotatable about the central axis 15, is formed of a thin ribbon of lightweight metal into which a 90° twist or bend is formed at 27 to provide a knife edge portion 28 which facilitates accurate reading of alignment of the pointer 12 with the fine divisions on the scale face 11. Another 90° twist combined with a 90° horizontal bend is formed in the extremity of the pointer arm 12 at 29, as shown in FIGURE 3, to provide a flag portion 30 which passes between the miniature light source 31 and the photocell detector 32 when the scale pointer 12 occupies the same radial angle as the set pointer arm 14, all as shown in FIGURE 3. In this position the flag 30 intercepts the light beam from source 31 to photodetector 32.

The set point arm 14 is formed of hollow tubing through which fine, insulated, flexible wire conductors 34 are passed from light source 31 and photodetector 32 to the electronic control box 19 of FIGURE 1. An inner disk 35 mounted on hub 36 forms with supporting member 16 a spool-like enclosure in which the flexible wires 34 are contained as the shaft 37 is rotated in either direction by knob 17 to position the set point arm 14 at any preselected angle or scale reading. The set point arm 14 is mounted on the hub 36 which is integral and coaxial with shaft 37 passing through a central hole in the glass cover 22. The knob 17 is externally secured to the shaft 37 by means of a set screw 38 and is separated from the face of the glass cover 22 by a spring washer 39, whereby the entire assembly of the set point arm and its connected parts is securely but rotatably mounted to the vertical support 16 and the glass cover 22.

The scale pointer 12 is rotatably mounted on a shaft 40 which is suitably journaled in and passed through the back plate 26 and is driven by any suitable force actuated means, such as a Bourdon tube pressure responsive transducer (not shown).

Attached to the outermost end of the tubular set pointer arm 14 is a stamped sheet metal bracket 41 to which is affixed a lamp socket bracket 42 for supporting the lamp 31. A hole 44 is pierced through the flat portion of bracket 41 to permit visual observation of the scale markings 11 on the face plate of the indicator. A hairline wire (not shown) stretched radially across the hole opening 44 enables precise alignment of the set pointer arm 14 with any desired preselected setting on the scale 11. At its outermost end bracket 41 is bent at a 90° angle as shown in FIGURE 3 to provide a support for the photosensitive detector 32 in alignment with the light source 31.

FIGURE 4 illustrates the appearance of the set point indicator as viewed from the front of the instrument through the cover glass, when the knife edge portion 28 of the scale pointer 12 is in exact alignment with the angular position to which the set pointer has been adjusted, as shown in FIGURE 3. The plane surface 46 of the bracket 41 is preferably painted white, or the same background color as the scale disk 11, while a red or black pointer is outlined thereon as shown at 45 in FIGURE 4.

Referring now to FIGURE 5, which is taken along the line 5—5 of FIGURE 3, the position of the indicator needle flag 30 between the light source 31 and the photodetector 32 is shown as viewed from within the instrument case, behind the opening 44. The manner in which the lamp source 31 is mounted in socket 47 secured to bracket 42, mounted on frame 41 is also illustrated. As seen in FIGURE 5 of the drawings, one of the two wires 34 from photodetector 32 is connected in common with one of the two wires from the light socket 47, thus forming one conductor which is common to both of these electronic components. In this manner only three wires 34 are required to be passed through the tubular set point arm 14.

FIGURE 6 illustrates an alternative embodiment of the invention which is similar in all respects to that of FIGURE 3 except for the mounting of the light source 31. As shown in FIGURE 6 a high intensity light source 31a is mounted within the indicator enclosure on the axis 15 of the indicator dial face, rather than being mounted on the adjustable bracket 41 carried by the set point indicator arm 14. Light rays from the lamp 31 in the embodiment of FIGURE 6 normally illuminate the photosensitive detector 32, regardless of the radial angle to which the set point arm 14 is moved. Nevertheless, when the flag 30 of the scale pointer 12 is in alignment with the center of the photodetector 32, the light rays from lamp 31 normally falling on detector 32 are intercepted by flag 30. A feature of the embodiment of FIGURE 6 is that the lamp 31a centrally located on the axis 15 provides generally uniform illumination around the entire periphery of the dial face 11, whereas in the embodiment of FIGURE 3 the movable lamp 31 provides dial face illumination only in the immediate vicinity of the scale where the pointer 14 has been set. In the embodiment of FIGURE 6 the inner surface of the rotatable disk 35 affixed to the hub 36 may be brightly polished to facilitate reflection of light rays from the lamp 31 back onto the face of the dial scale 11.

Figure 2:
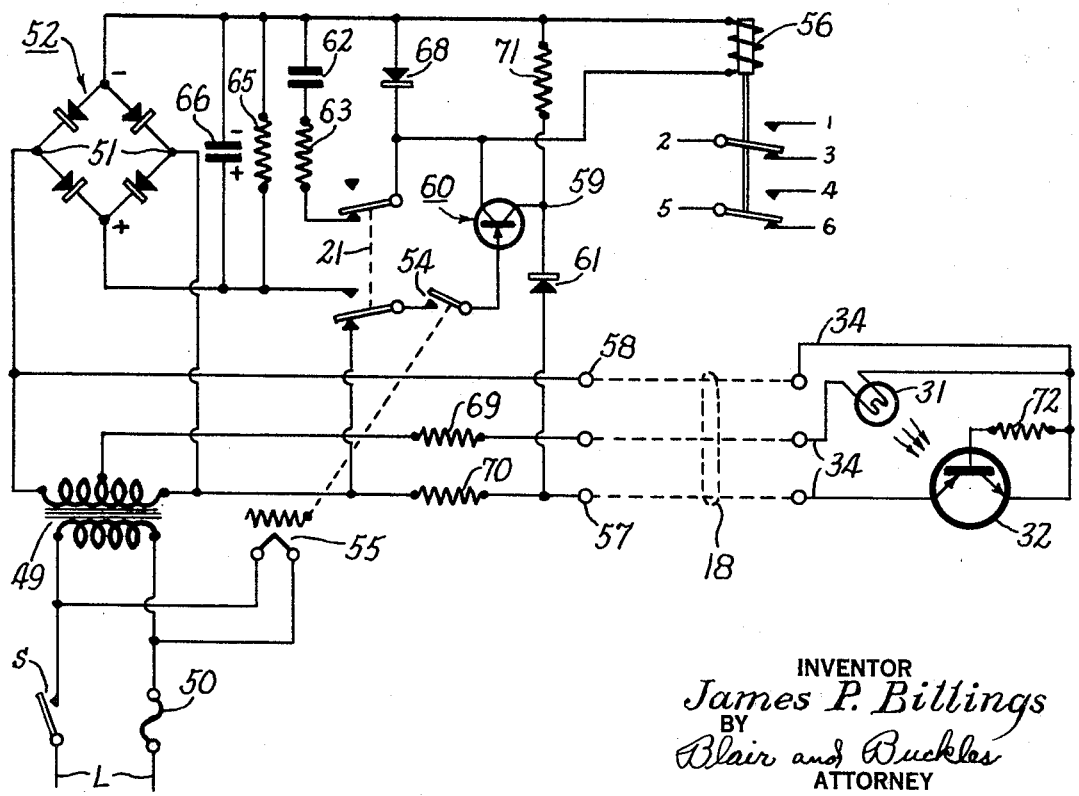
FIGURE 2 is a schematic circuit diagram of the solid state electronic relay means employed in the invention to operate the output control relay.

FIGURE 7 shows an alternative construction for the outer end of the set point indicator arm 14, wherein two separate photosensitive detectors are mounted side by side. In this embodiment the second detector, comprising lamp 31' and photocell 32', provides means for anticipating the arrival of gauge pointer 12 at the desired preset weight indication. To reduce the number of wires 34 required to be passed through supporting tube 14 in the embodiment of FIGURE 7, the lamps 31 and 31' are connected in parallel. The secondary "dribble detector" of 31'-32' may be positioned as shown in FIGURE 7, to be located clockwise of primary set point detector 31-32, for down-weighing control, or the relative side by side positions of the primary and secondary detectors may be reversed from that shown in FIGURE 7 for up-weighing control. The photoelectric detector cells 32 and 32' are each connected to separate electronic relay circuits. A preferred electronic relay circuit is shown in FIGURE 2 of the drawings.

Description of electronic control circuit

Reference will now be made to the circuit diagram of FIGURE 2 which discloses one embodiment of a control circuit suitable for use with the photoelectric set point mechanism hereinabove described.

A power transformer 49 has its primary winding connected to a power line source L through switch S and a protective fuse 50, and its secondary winding connected to the input terminals 51 of a full-wave solid state rectifier bridge 52. A thermal time delay switch 54 has its heater element 55 also connected across the power line L, through switch S, to prevent premature operation of the control relay 56 when power is initially applied through closure of switch S. Because the solid state photocell 32 reacts immediately to the application of power, while the light source 31 requires at least 100 ms. to reach full intensity, and since the circuit of FIGURE 2 is designed to hold the control relay inoperative until the light is interrupted, an initial time delay mechanism is required to allow time for lamp 31 to warm up.

The photocell 32 is preferably a solid state device, and in the circuit embodiment of FIGURE 2 is a light actuated silicon controlled rectifier commonly referred to as a LASCR. With light from source 31 falling on cell 32, a circuit is closed between junctions 57 and 58 through cell 32. This causes control gate junction 59 of a second silicon controlled rectifier 60 to be at zero voltage, thereby preventing operation of SCR-60—hence no current can flow through relay 56. However, when the flag 30 of scale pointer 12 intercepts the light beam from source 31 to cell 32 (as shown in FIGURES 3 and 5) current ceases to flow through cell 32 and the output control relay 56 is caused to be energized, as will be more fully described hereinafter.

A double pole double throw toggle switch 21 provides manual selection of either of two modes of operation, designated as (1) Automatic Reset, and (2) Maintained Operation. The circuit is in the Automatic Reset mode when switch 21 is in the position shown in FIGURE 2.

When the light beam from source 31 is interrupted by the flag 30 of the scale needle pointer 12, the light actuated SCR-32 ceases to conduct, and positive voltage builds up at junction 57 causing diode 61 to conduct. Conduction through diode 61 fires SCR-60 with a positive voltage. Operation of SCR-60 pulls up relay 56, and also charges condenser 62 through resistor 63. During the negative half cycle SCR-60 shuts off but discharge of condenser 62 through resistor 63 maintains relay 56 operated until the next positive half cycle again turns on SCR-60—so long as the light beam remains interrupted by the needle pointer flag 30. When light again falls on the light actuated SCR-32, the SCR-60 is turned off and relay 56 drops out.

When toggle switch 21 is moved up to the opposite position shown in FIGURE 2, the circuit is conditioned for its second mode, designated Maintained Operation. In this condition full wave bridge rectifier 52 applies positive DC to SCR-60 thereby causing it to conduct, and relay 56 is thus energized. In this mode the relay 56 remains locked up until the circuit is broken manually.

Resistor 65 and capacitor 66 provide a filter across the rectifier 52. Diode 68 is connected across the coil of relay 56 to bypass inductive voltage spikes when relay 56 is in the process of dropping out, thereby protecting SCR-60 from damage. Resistor 70 is a current limiting resistor for photodetector 32, and when connected in series with resistor 71 upon interruption of the light beam, both resistors 70 and 71 serve as a voltage divider for SCR-60. Resistor 69 is merely a current limiter for the miniature lamp 31. Resistor 72 provides gate bias for the light actuated SCR-32.

Typical values for the circuit components of FIGURE 2 are as follows.

Resistors:
```
63 ---------------------- 10 ohms, 2 w.
65 ---------------------- 10K ohms, ½ w.
69 ---------------------- 20 ohms, ½ w.
70 ---------------------- 3.3K ohms, ½ w.
71 ---------------------- 2K ohms, ½ w.
72 ---------------------- 56K ohms, 1/10 w.
```
Capacitors:
```
62 ---------------------- 40 mfd.
66 ---------------------- 40 mfd.
```

SCR-60 is obtained from the General Electric Company and is designated as GE C20F, 7.5 amps, 50 v.

LASCR-32 is also manufactured by General Electric and designated as GE L9F rated at 400 ma., 50 v.

Diodes 61 and 68 are both designated GE 1N1695 rated at 600 ma. at 400 v.

Bridge 52 is designated as EDAL K7A5, 1.5 amps at 50 v.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is to be understood that more than one independently adjustable set point arm may be provided for sequential triggering of remote controls as different weigh points are indicated by the gauge needle. Also fixed set points may be mounted at preselected positions around the periphery of the scale dial, and alternative embodiments of the invention may include mounting of a microscopic light source on the moving needle pointer to sequentially illuminate successive photoelectric detectors as the gauge indicator advances in either direction.

It is also to be understood that the following claims are intended to cover all of the generic and specific features of the invention which, as a matter of language, might be said to fall therebetween.

Having described my invention, what I claim as new and desire to secure by Letters Patent is:

1. In a process weighing system gauge indicator having a graduated scale face and a weight indicating scale pointer movable relative to said scale face, control means responsive to the indication of a preselected weight for actuating a remote controller, comprising in combination:
 (A) a photoelectric detector positioned within the gauge adjacent to the periphery of the scale face;
 (B) a lamp mounted within the gauge in a position to illuminate said detector;
 (C) an opaque flag member secured to the outer end of the scale pointer in a position to pass between said lamp and said detector and interrupt the illumination thereof; and
 (D) an electronic control circuit comprising
  (1) an A.C. source connected to energize said detector and said lamp,
  (2) a full wave rectifier network connected to be energized from said A.C. source and having
   (a) first and second output terminals,
  (3) a controlled rectifier having
   (a) an anode,
   (b) a cathode, and
   (c) a gate,
  (4) a resistor connected between said A.C. source and said detector, and
  (5) a diode connecting a junction between said resistor and said detector to said gate,
   (a) said diode being poled to supply triggering signals to said gate rendering said controlled rectifier conductive during half cycles of said A.C. source when said detector is rendered nonconductive by said flag interrupting the illumination thereof,
(6) a relay adapted to selectively actuate the control means and having
    (a) an operating coil connected in circuit between said cathode and said first output terminal of said rectifying network so as to be energized when said controlled rectifier is conducting,
(7) a mode switch having
    (a) a first position connecting said anode directly to said A.C. source, and
    (b) a second position connecting said anode to said second output terminal of said rectifying network.

2. The weighing system control according to claim 1 wherein said electronic control circuit further includes
(1) a capacitor connected in circuit with said relay operating coil when said mode switch is in said first position to sustain energization thereof during those half cycles of said A.C. source when said controlled rectifier is nonconductive.

References Cited

UNITED STATES PATENTS

| | | | |
|---|---|---|---|
| 2,319,406 | 5/1943 | Jones | 250—231 X |
| 2,365,601 | 12/1944 | Sipman | 250—231 X |
| 2,049,283 | 7/1936 | Weckerly | 250—231 |
| 2,120,381 | 6/1938 | Troxell | 250—231 |
| 2,130,296 | 9/1938 | Caldwell | 250—231 |
| 3,249,759 | 5/1966 | Sendro | 250—231 |

OTHER REFERENCES

Howell, E. Keith: "Light-Activated Switch Expands Uses of Silicon-Controlled Rectifiers," Electronics, May 4, 1964, pp. 53 to 55.

RALPH G. NILSON, *Primary Examiner.*

T. N. GRIGSBY, *Assistant Examiner.*

U.S. Cl. X.R.

250—211, 231